United States Patent
Brochin et al.

(10) Patent No.: US 6,732,790 B2
(45) Date of Patent: May 11, 2004

(54) SINGLE HEAT EXCHANGER

(75) Inventors: Christopher C. Brochin, Dearborn, MI (US); Jeffrey Avedesian, Canton, MI (US); Jeff Southwood, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/010,096

(22) Filed: Nov. 7, 2001

(65) Prior Publication Data

US 2003/0205365 A1 Nov. 6, 2003

Related U.S. Application Data

(62) Division of application No. 09/470,546, filed on Dec. 22, 1999, now Pat. No. 6,360,817.

(51) Int. Cl.[7] .................................................. F28D 7/00
(52) U.S. Cl. .......................................... 165/140; 165/77
(58) Field of Search .............................. 165/140, 77, 76, 165/144, 145

(56) References Cited

U.S. PATENT DOCUMENTS

| 3,000,193 A | 9/1961 | Crider |
| 3,207,216 A | 9/1965 | Donaldson |
| 3,341,925 A | 9/1967 | Gerstung |
| 4,034,804 A | 7/1977 | Meijer et al. |
| 4,076,072 A | 2/1978 | Bentz |
| 4,546,820 A | * 10/1985 | Whipple ..................... 165/77 |
| 5,033,540 A | 7/1991 | Tategami et al. |
| 5,046,550 A | 9/1991 | Boll et al. |
| 5,174,366 A | 12/1992 | Nagakura et al. |
| 5,180,004 A | 1/1993 | Nguyen |
| 5,564,495 A | 10/1996 | Yoshihashi et al. |
| 5,573,059 A | 11/1996 | Hamamoto et al. |
| 5,720,341 A | * 2/1998 | Watanabe et al. ........... 165/140 |
| 5,855,240 A | 1/1999 | Farrell et al. |
| 5,884,696 A | 3/1999 | Loup |
| 5,896,921 A | 4/1999 | Lee |

FOREIGN PATENT DOCUMENTS

| DE | 3542189 | * 6/1987 | ................. 165/140 |
| DE | 35 42 189 A 1 | 6/1987 | |

* cited by examiner

Primary Examiner—Leonard R Leo
(74) Attorney, Agent, or Firm—Brinks Hofer Gilson & Lione

(57) ABSTRACT

A single heat exchanger includes a first core and a second core and a connecting mechanism interconnecting the first core and the second core. The first core and the second core are positioned at an angle relative to each other via the connecting mechanism.

18 Claims, 3 Drawing Sheets

SINGLE HEAT EXCHANGER

This application is a divisional of U.S. Application Ser. No. 09/470,546 filed Dec. 22, 1999.

BACKGROUND OF THE INVENTION

1. Field of the Invention

The present invention relates generally to heat exchangers and, more specifically, to a single heat exchanger used in a motor vehicle.

2. Description of the Related Art

It is known to provide motor vehicles with heat exchangers such as condensers, evaporators, heaters, and coolers. Typically, these heat exchangers have separate cores such that a separate heat exchanger core is provided for an evaporator and a heater. However, separate stamping press dies are required for each heat exchanger core, resulting in a relatively large amount of floor space for each stamping die. Further, stamping each separate heat exchanger core is not efficient, resulting in a relatively large amount of stamping scrap.

Therefore, it is desirable to provide a single heat exchanger having an evaporator core and a heater core. Also, it is desirable to provide a heat exchanger having two separate cores in a single stamping.

SUMMARY OF THE INVENTION

Accordingly, the present invention is a single heat exchanger including a first core and a second core and a connecting mechanism interconnecting the first core and the second core. The first core and the second core are positioned at an angle relative to each other via the connecting mechanism.

One advantage of the present invention is that a single heat exchanger is provided having a separate evaporator core and heater core. Another advantage of the present invention is that single heat exchanger includes tabs or a common end sheet that allows the cores to be positioned at an angle to each other. Yet another advantage of the present invention is that the single heat exchanger allows the cores to be positioned at an angle and facilitate the use of traditional climate control strategies, which incorporate blend doors for temperature control. Still another advantage of the present invention is that the single heat exchanger increases manufacturing efficiencies by producing both cores at the same time and decreasing manufacturing costs. A further advantage of the present invention is that the single heat exchanger may also reduce required packaging space in a motor vehicle.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
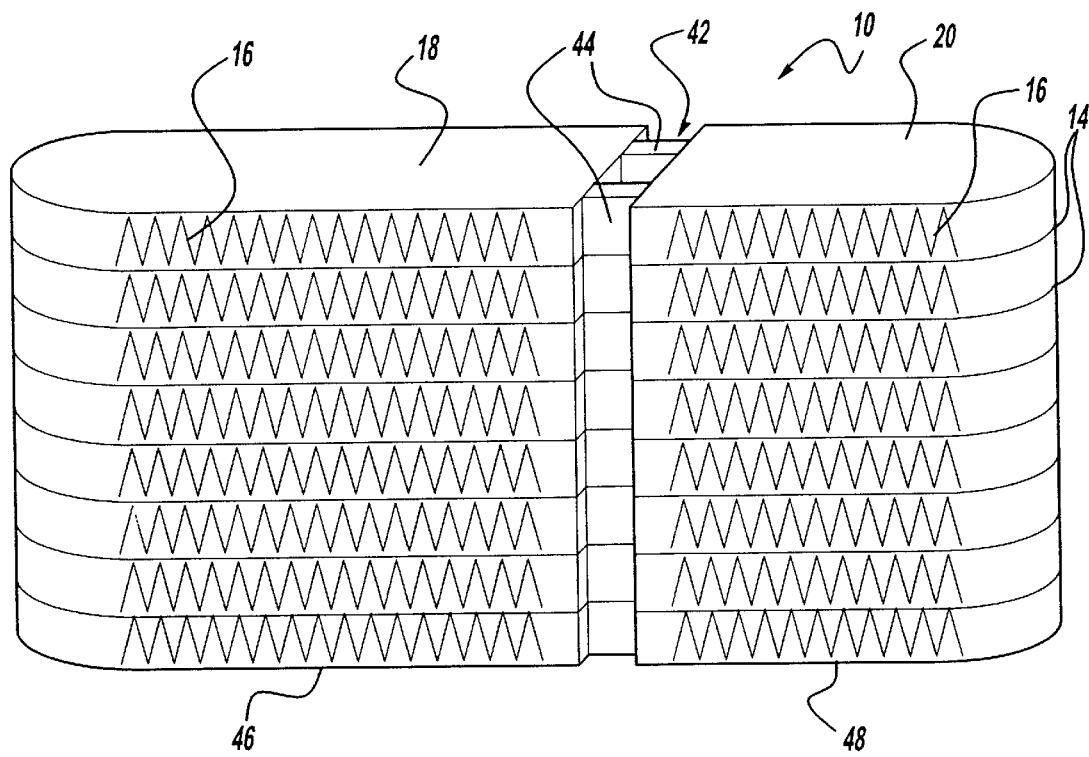
FIG. 1 is a perspective view of a single heat exchanger, according to the present invention.
Figure 4:
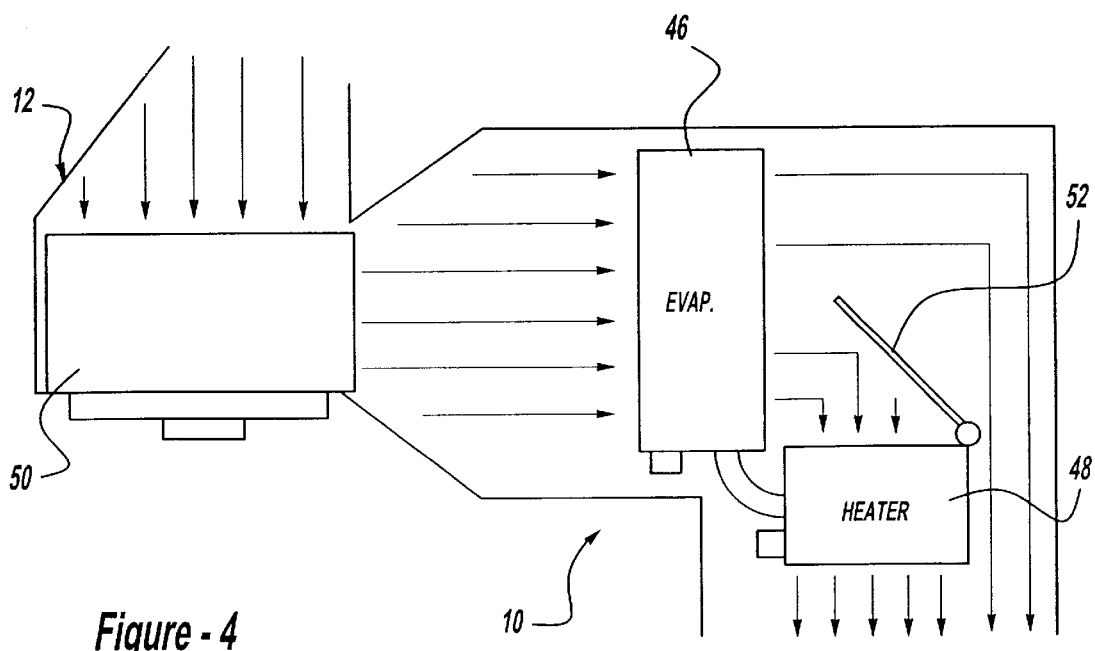
FIG. 4 is a diagrammatic view of the single heat exchanger of FIG. 3 illustrated in operational relationship with a motor vehicle.

Referring to the drawings and in particular FIGS. 1 and 4, one embodiment of a single heat exchanger 10, according to the present invention, is shown for a climate control system 12 of a motor vehicle (not shown). The single heat exchanger 10 includes a plurality of generally parallel beaded plates 14, pairs of which are joined together in a face-to-face relationship to provide a channel (not shown) therebetween. The single heat exchanger 10 also includes a plurality of convoluted or serpentine fins 16 attached to an exterior of each of the beaded plates 12. The fins 16 are disposed between each pair of the joined beaded plates 14 to form a stack as illustrated in FIG. 1. The fins 16 serve as a means for conducting heat away from the beaded plates 14 while providing additional surface area for convective heat transfer by air flowing over the single heat exchanger 10. It should be appreciated that the single heat exchanger 10 could be used in other applications besides motor vehicles.

Figure 2:
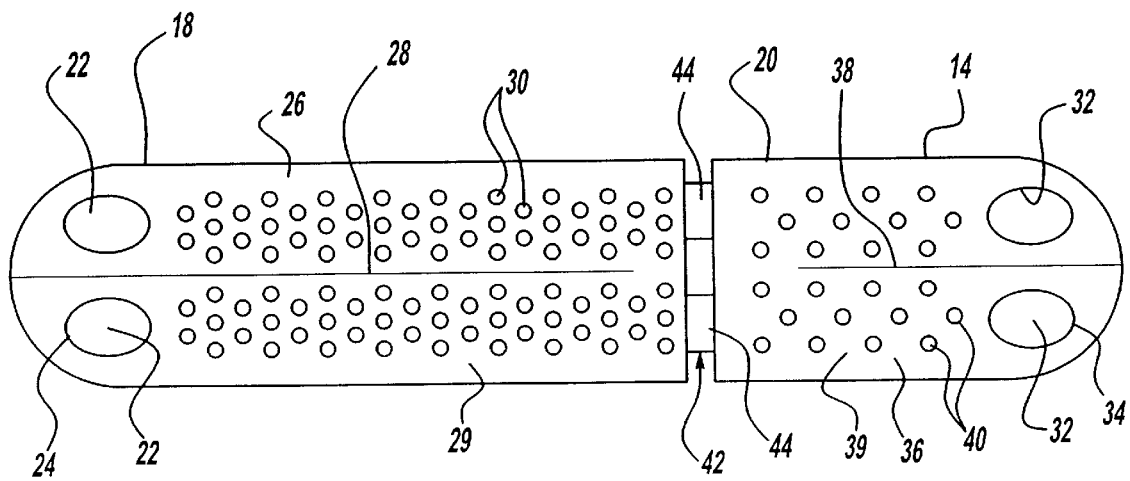
FIG. 2 is a plan view of a portion of the single heat exchanger of FIG. 1.

Referring to FIG. 2, the beaded plate 14 extends longitudinally and is substantially planar or flat. The beaded plate 14 includes a first core portion such as an evaporator core portion 18 and a second core portion such as a heater core portion 20. The evaporator core portion 18 includes a raised boss (not shown) on one end having a pair of laterally spaced apertures 22 extending therethrough. The bosses are stacked together such that the apertures 22 are aligned to form a flow header 24 to allow parallel flow of fluid through the channels of the evaporator core portion 18 of the beaded plates 14. The evaporator core portion 18 includes a surface 26 being generally planar and extending longitudinally and laterally. The evaporator core portion 18 also includes a dividing wall 28 extending longitudinally from the end adjacent the flow header 24 and terminating a predetermined distance from the other end to form a fluid passage 29 from an inlet one of the apertures 22 to an outlet one of the apertures 22. The evaporator core portion 18 also includes a plurality of beads 30 extending above and generally perpendicular to a plane of the surface 26 and spaced laterally from each other. The beads 30 are generally circular in shape, but may have any suitable shape, and have a predetermined diameter such as three millimeters. It should be appreciated that the flow headers 24 can be at opposite ends of the channel creating single pass evaporator core portion 18 or on the same side of the channel creating a U flow evaporator core portion 18.

The heater core portion 20 includes a raised boss (not shown) on one end having a pair of laterally spaced apertures 32 extending therethrough. The bosses are stacked together such that the apertures 32 are aligned to form a flow header 34 to allow parallel flow of fluid through the channels of the heater core portion 20 of the beaded plates 14. The heater core portion 20 includes a surface 36 being generally planar and extending longitudinally and laterally. The heater core portion 20 also includes a dividing wall 38 extending longitudinally from the end adjacent the flow header 34 and terminating a predetermined distance from the other end to form a fluid passage 39 from an inlet one of the apertures 32 to an outlet one of the apertures 32. The heater core portion 20 also includes a plurality of beads 40 extending above and generally perpendicular to a plane of the surface 36 and spaced laterally from each other. The beads 40 are generally circular in shape, but may have any suitable shape, and have a predetermined diameter such as three millimeters. It should be appreciated that the flow headers 34 can be at opposite ends of the channel creating single pass heater core portion 20 or on the same side of the channel creating a U flow heater core portion 20.

The single heat exchanger 10 also include a connecting mechanism, generally indicated at 42, interconnecting the ends of the evaporator core portion 18 and heater core portion 20 of the beaded plates 14. The connecting mechanism 42 is a plurality of connection tabs 44 extending longitudinally and spaced laterally between the ends of the evaporator core portion 18 and heater core portion 20 for a function to be described. The beaded plates 14 are made of a metal material such as aluminum. Each beaded plate 14 is formed as a single stamping and as a monolithic structure being integral and one-piece. It should be appreciated that the connection tabs 44 provide the support and rigidness needed during assembly of the single heat exchanger 10. It should also be appreciated that the beaded plates 14 are stamped to position the evaporator core portion 18 and heater core portion 20 of the single heat exchanger 10 back to back in a single stamping press die, thereby maximizing stamping efficiency, while minimizing floor space requirements and stamping scrap.

The single heat exchanger 10 further includes oppositely disposed first and second mounting tanks or plates (not shown) at ends of the stack. The mounting plates fluidly communicate with the flow headers 24 and 34. The single heat exchanger 10 includes a fluid inlet (not shown) for conducting fluid into the evaporator core portion 18 formed in the mounting plates and a fluid outlet (not shown) for directing fluid out of the evaporator core portion 18 formed in the mounting plates. The single heat exchanger 10 includes a fluid inlet (not shown) for conducting fluid into the heater core portion 20 formed in the mounting plates and a fluid outlet (not shown) for directing fluid out of the heater core portion 20 formed in the mounting plates. It should be appreciated that fluid does not fluidly communicate between the evaporator core portion 18 and the heater core portion 20.

Figure 3:
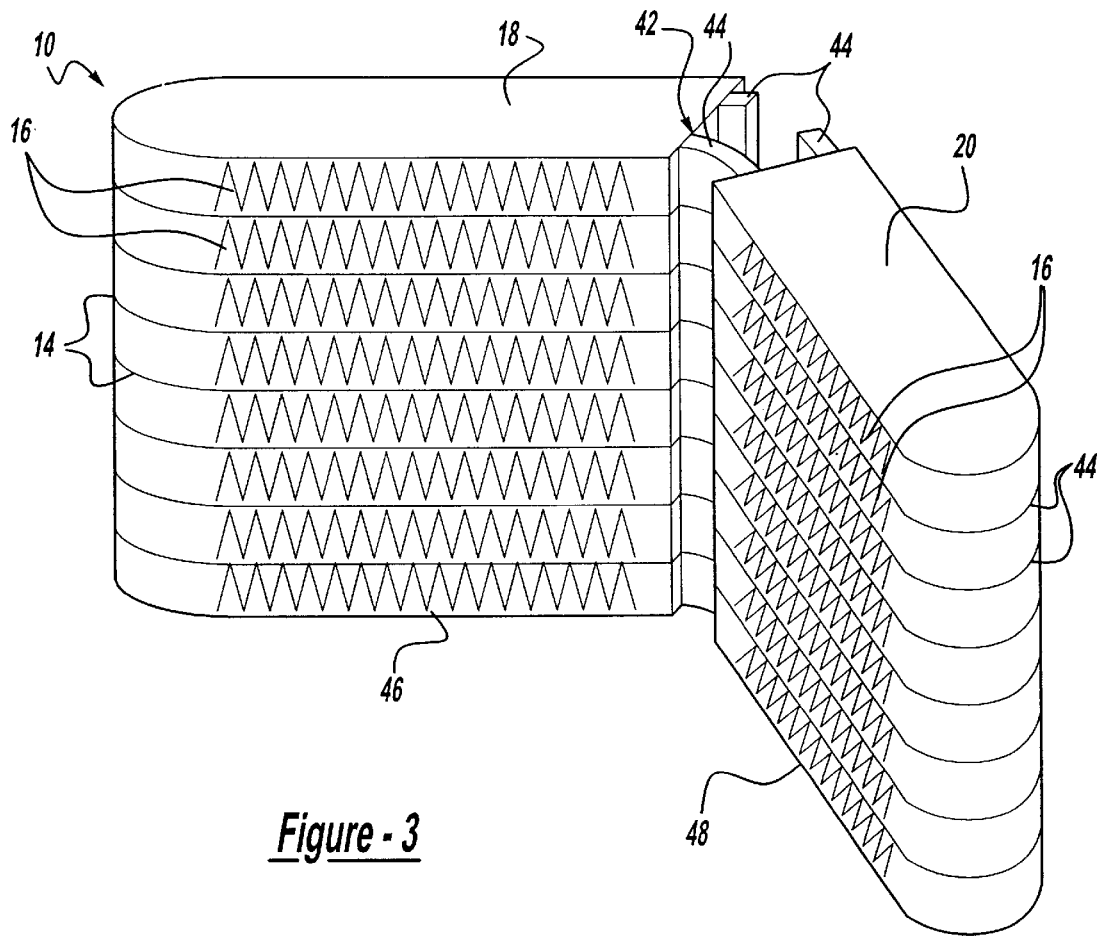
FIG. 3 is a view similar to FIG. 1 illustrating the single heat exchanger in an operative position.

Referring to FIGS. 3 and 4, the single heat exchanger 10 is assembled with the beaded plates 14 in mirrored opposite pairs to form the channels and flow headers and fins 16 disposed between the pairs of the beaded plates 14, creating a heat exchanger with a first core such as an evaporator core 46 at one end and a second core such as a heater core 48 at the other end. End plates (not shown) and connector tubes (not shown) for both refrigerant and coolant are also added to complete the assembly of the single heat exchanger 10. The single heat exchanger 10 is brazed to form a leak free unit. Once brazed, one side or set of connection tabs 44 are cut or severed, providing flexibility, and the evaporator core 46 and heater core 48 are positioned at an angle relative to each other as illustrated in FIG. 3. It should be appreciated that, with at least one row of the connecting tabs 44 remaining, the evaporator core 46 and heater core 48 can be bent using this row of connection tabs 44 as the axis of rotation. It should also be appreciated that the severing of the connection tabs 44 does not impinge on the fluid passages or the collection and return tanks so that the combination core of the single heat exchanger 10 remains leak free.

As illustrated in FIG. 4, the single heat exchanger 10 is installed in the climate control system 12. In the climate control system 12, fresh air is pushed through one hundred percent from a blower 50 to the evaporator core 46 as illustrated by the arrows. The air flows through the fins 16 of the evaporator core 46 and the air is cooled for air conditioner performance and dehumidified for improved defroster performance. As the air leaves the evaporator core 46, a percentage from zero to one hundred of the air is directed through the heater core 48. The percentage is determined by adjusting the position of a temperature control door 52 and directed to the heater core 48. The air flows past the fins 16 through the heater core 48 for temperature control. The climate control system 12 can be deactivated to eliminate the need to heat air that has already been cooled when full heat is required. In a defroster mode, the climate control system 12 is activated to remove moisture from the incoming air.

Figure 5:
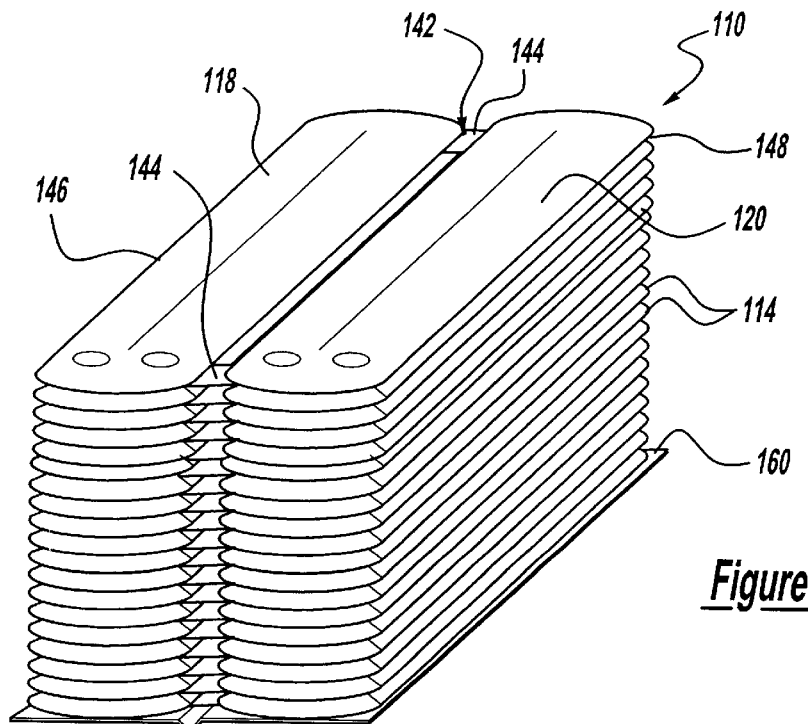
FIG. 5 is a perspective view of another embodiment, according to the present invention, of the single heat exchanger of FIG. 1.
Figure 6:
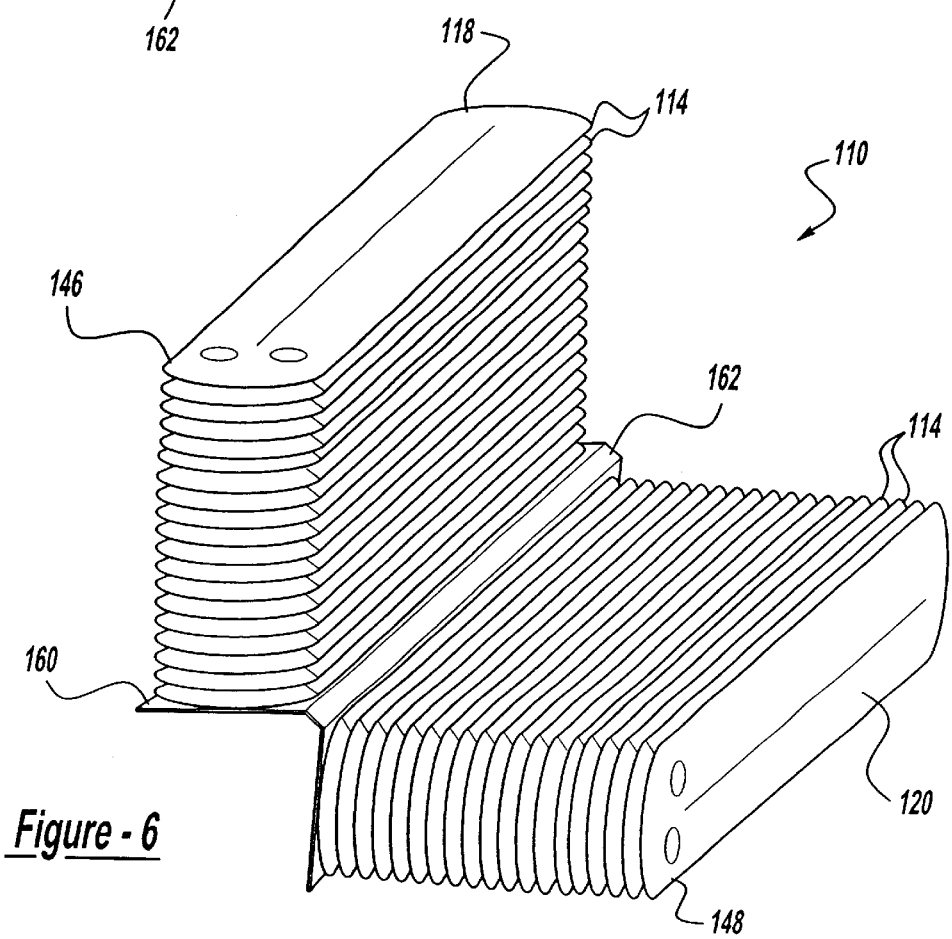
FIG. 6 is a view similar to FIG. 5 illustrating the single heat exchanger in an operative position.

Referring to FIGS. 5 and 6, another embodiment 110, according to the present invention, is shown for the single heat exchanger 10. Like parts of the single heat exchanger 10 have like reference numerals increased by one hundred (100). In this embodiment, the single heat exchanger 110 has the evaporator core 146 and heater core 148 produced at the same time. The single heat exchanger 110 has the beaded plates 114 with the evaporator core portion 118 and heater core portion 120 extending longitudinally and spaced laterally by the connecting mechanism 142 interconnecting the sides of the evaporator core portion 118 and heater core portion 120. The connecting mechanism 142 includes a plurality of connection tabs 144 extending laterally and spaced longitudinally between the sides of the evaporator core portion 118 and heater core portion 120. The beaded plates 114 are made of a metal material such as aluminum. Each beaded plate 114 is formed as a single stamping and as a monolithic structure being integral and one-piece.

The connecting mechanism 142 also includes a common bottom end sheet 160 connected to the evaporator core 146 and heater core 148 by suitable means such as brazing. The bottom end sheet 160 has a crease 162 extending longitudinally and disposed between the evaporator core 146 and heater core 148. The crease 162 is a living hinge in the bottom end sheet 160 to permit bending thereof. The bottom end sheet 160 is made of a metal material such as aluminum. Alternatively, the beaded plates 114 that form the heater core portion 120 could be stamped with one die, followed by stamping out the common bottom end sheet 160 and then stamping out the beaded plates 114 that form the evaporator core portion 118, and assembled such that the heater core 148 and evaporator core 146 are positioned end to end with the common end sheet 160 connecting the two. It should be appreciated that the bottom end sheet 160 runs parallel to the beaded plates 114 and permits bending.

In operation, the single heat exchanger 110 is assembled with the beaded plates 114 and fins 116 disposed between pairs of the beaded plates 114 that form the channels, creating a heat exchanger with the evaporator core 146 on one side and the heater core 148 on the other side. The connecting tabs 144 are cut or severed, providing flexibility, and the evaporator core 146 and heater core 148 are positioned at an angle relative to each other as illustrated in FIG. 6. It should be appreciated that the single heat exchanger 110 may be installed in the climate control system 12 similar to the single heat exchanger 10. It should also be appreciated that the single heat exchanger 110 has a combination heater core 146 and evaporator core 148 produced simultaneously then bent to a predetermined angle about the crease 162 in the bottom end sheet 160 that the two cores 146 and 148 share. It should further be appreciated that by positioning the cores 146 and 148 at an angle allows the use of the blend door 52 for temperature control.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A single heat exchanger comprising:
   a first core and a second core;
   a plurality of plates having a first core portion to form said first core and a second core portion to form said second core;
   a member connected to said first core and said second core; and
   a connecting mechanism laterally interconnecting said first core and said second core, wherein said connecting mechanism is severed to allow positioning of said first core and said second core at an angle greater then zero degrees relative to each other.

2. A single heat exchanger as set forth in claim 1 wherein said member includes a living hinge between said first core and said second core.

3. A single heat exchanger as set forth in claim 1 wherein said member comprises a common end sheet connected to said first core and said second core.

4. A single heat exchanger as set forth in claim 1 wherein said first core portion extends longitudinally and said second core portion extends longitudinally.

5. A single heat exchanger as set forth in claim 1 wherein said connecting mechanism comprises a plurality of tabs extending laterally between sides of said second core portion and said first core portion and spaced longitudinally.

6. A single heat exchanger as set forth in claim 1 wherein each of said second core portion and said first core portion have a flow header.

7. A single heat exchanger as set forth in claim 1 wherein said plates include a plurality of beads.

8. A single heat exchanger as set forth in claim 1 wherein said plates are made of a metal material.

9. A single heat exchanger as set forth in claim 1 wherein each of said plates is formed as a single stamping and as a monolithic structure being integral and one-piece.

10. A single heat exchanger comprising:
    an evaporator core and a heater core;
    a plurality of plates having an evaporator core portion to form said evaporator core and a heater core portion to form said heater core, said evaporator core portion extending longitudinally and said heater core portion extending longitudinally; and
    a living hinge interconnecting said evaporator core and said heater core and a connecting mechanism laterally interconnecting said evaporator core and said heater core, wherein said connecting mechanism is severed to allow positioning of said evaporator core and said heater core at an angle greater than zero degrees relative to each other via said living hinge.

11. A single heat exchanger as set forth in claim 10 including a common end sheet connected to said evaporator core and said heater core.

12. A single heat exchanger as set forth in claim 11 wherein said end sheet is at a bottom of said evaporator core and said heater core.

13. A single heat exchanger as set forth in claim 11 wherein said living hinge comprises a crease in said common end sheet disposed between said evaporator core and said heater core.

14. A single heat exchanger comprising:
    an evaporator core and a heater core;
    a living hinge interconnecting said evaporator core and said heater core, wherein said evaporator core and said heater core are positioned at an angle relative to each other via said living hinge;
    a plurality of plates having an evaporator core portion to form said evaporator core and a heater core portion to form said heater core, said evaporator core portion extending longitudinally and said heater core portion extending longitudinally, and
    a plurality of tabs extending laterally between sides of said heater core portion and said evaporator core portion and spaced longitudinally, said tabs being severed to allow positioning of said evaporator core and said heater core.

15. A single heater exchanger comprising:
    an evaporator core and a heater core;
    a plurality of plates having an evaporator core portion to form said evaporator core and a heater core portion to form said heater core;
    a member connected to said evaporator core and said heater core; and
    a plurality of connection tabs extending laterally between longitudinal sides of said evaporator core and said heater core, wherein said are severed to allow positioning of said evaporator core and said heater core, wherein said tabs are severed to allow positioning of said evaporator core and said heater core at an angle greater than greater relative to each other.

16. A single heat exchanger as set forth in claim 15 wherein said evaporator core portion extends longitudinally and said heater core portion extends longitudinally.

17. A single heater exchanger as set forth in claim 16 wherein said tabs are spaced longitudinally between the sides of said heater core portion and said evaporator core portion.

18. A single heat exchanger comprising:
    a first core and a second core;
    a common end sheet connected to said first core and said second core; and
    a plurality of tabs extending laterally interconnecting said first core and said second core, said tabs being severed to allow positioning of said first core and said second core at an angle greater than zero degrees relative to each other via said end sheet.

* * * * *

UNITED STATES PATENT AND TRADEMARK OFFICE
CERTIFICATE OF CORRECTION

PATENT NO. : 6,732,790 B2
DATED : May 11, 2004
INVENTOR(S) : Christopher C. Brochin et al.

It is certified that error appears in the above-identified patent and that said Letters Patent is hereby corrected as shown below:

Column 6,
Line 21, immediately after "longitudinally" delete "," (comma) and substitute -- ; -- (semicolon) in its place.
Line 37, after "wherein said" insert -- tabs --.
Line 38, immediately after "heater core" delete "," (comma).
Lines 39-40, delete "wherein said tabs are severed to allow positioning of said evaporator core and said heater core".
Line 41, delete "greater than greater" an substitute -- greater than zero degrees -- in its place.
Line 47, after "single" delete "heater" and substitute -- heat -- in its place.

Signed and Sealed this

Twenty-fourth Day of August, 2004

JON W. DUDAS
*Director of the United States Patent and Trademark Office*